March 20, 1962 J. K. HILLIARD ET AL 3,026,374

VOICE-CONTROL TELEPHONE CONFERENCE SYSTEM

Filed June 26, 1958

JOHN K. HILLIARD
ERIC MITCHELL
INVENTORS

BY Lyon & Lyon

ATTORNEYS 3,026,374
Patented Mar. 20, 1962

3,026,374

VOICE-CONTROL TELEPHONE CONFERENCE SYSTEM

John K. Hilliard, 2237 Mandeville Canyon Road, Los Angeles, Calif., and Eric Mitchell, 718 Catalina Ave., Santa Ana, Calif.

Filed June 26, 1958, Ser. No. 744,802
5 Claims. (Cl. 179—1)

This invention relates to two-way signal transmission systems and, more particularly, to improvements in telephone conference systems.

There are many arrangements known for permitting a conference to be held between two stations separated by a transmission path. At each station there is usually a microphone and a loudspeaker which respectively are at the end of the transmitting and receiving paths coupled to the transmission system. Usually, the microphone is coupled to the transmission system by way of some type of voice-frequency-operated volume-range expansion arrangement, and the loudspeaker may be coupled to the transmission path by means of some voice-signal-operated volume-range compression arrangement. These volume-range expansion and compression arrangements are usually controlled by some common equipment which itself is controlled by voice-frequency signals, either in the transmission path, the receiving path, or both. These arrangements are usually characterized by their complexity, not only in the apparatus required for controlling the volume-expansion and compression equipment, but also by the complexity of the apparatus required to properly couple the transmitting and receiving circuits to the transmission path.

Accordingly, an object of this invention is to provide a simple arrangement for a telephone conference system.

Another object of this invention is to provide a simple arrangement for coupling a telephone conference system to a transmission line.

Yet another object of the present invention is the provision of a novel and inexpensive telephone conference system.

These and other objects of the invention are achieved in an arrangement wherein at a station there is provided a telephone conference set comprising a voice-signal-transmitting circuit, including an input amplifier. There is also provided a voice-signal-receiving circuit, including an output amplifier. The input amplifier is voice-operated, as is the output amplifier. The input amplifier has the property that when quiescent it has its gain established at a low level, but the level increases in response to voice signals. The output amplifier has the property that low level input signals are amplified with high gain while high level input signals are amplified with low gain. The input amplifier has a slower attack time and a faster recovery time than the output amplifier. The signal-transmitting-and-receiving circuits are coupled to the line by means of repeater coils which include means for attenuating any voice signals which may pass directly between the signal-transmitting-and-receiving circuits.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

The system to be described consists of an arrangement of amplifiers and transformers so connected that signals can be transmitted simultaneously in both directions over a single circuit or pair of wires. Although the arrangement to be described shows a microphone as the signal-input transducer and a loudspeaker as the signal-output transducer, it will be appreciated that this is by way of illustration, and not as a limitation to the invention. When a microphone is employed and the signals therefrom are subsequently reproduced on a loudspeaker, this invention provides an arrangement for a single person or group to talk to others without the use of individual telephones. The system is live in both directions at all times, and it is not necessary to operate a talk-listen switch.

Figure 1:
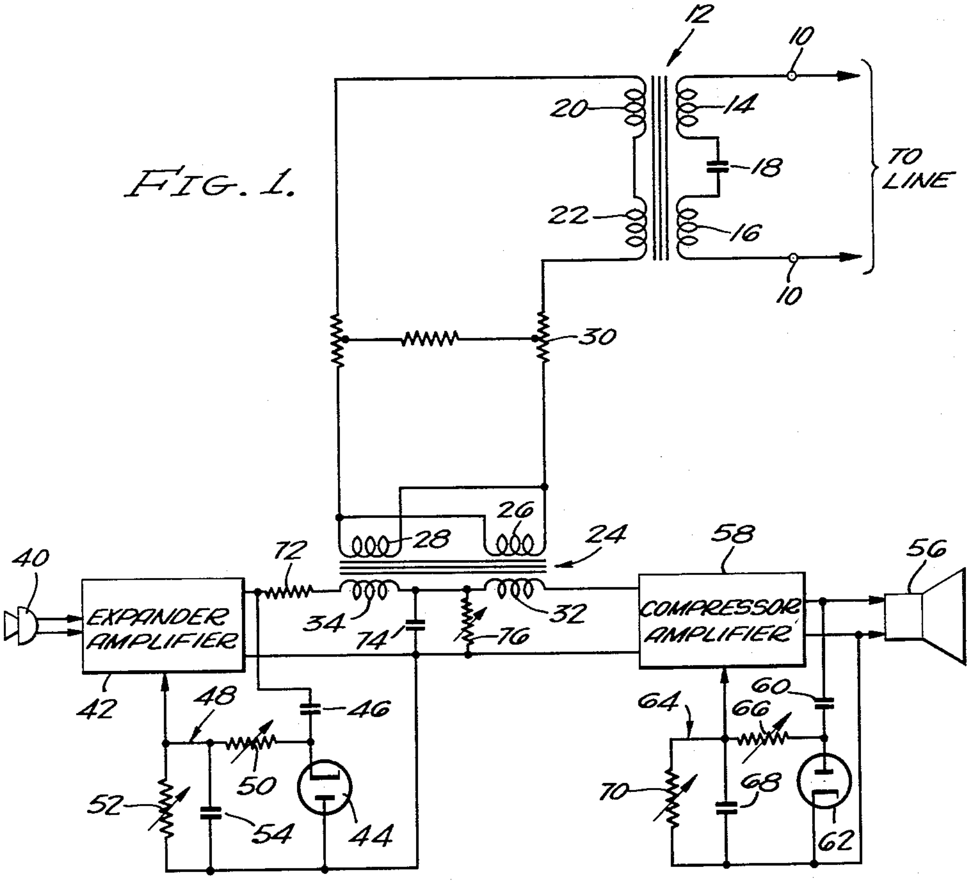
FIGURE 1 is a circuit diagram of an embodiment of the invention.

Referring now to FIGURE 1, the system includes line terminals 10, which may become connected to a suitable transmission path. The line terminals are connected to a repeater coil 12. The repeater coil has a pair of primary windings 14, 16, which are connected to each other through a condenser 18. The condenser serves the function of blocking the direct current on the line flowing through the repeater coil. The secondary windings 20, 22 of the repeater coil are connected in series with each other. These may be directly connected to the primary windings of a second repeater coil 24. However, if the conditions of the line and the signals permit, it is preferred to insert an attenuator pad 30 between the two repeater coils. The two primary windings 26, 28 of the repeater coil 24 are connected in parallel with the pad 30. The two secondary windings 32, 34 of the repeater coil 24 are connected in series with each other.

A microphone 40 applies any voice-frequency signals to an input amplifier 42. This amplifier and its associated circuitry exemplifies well-known circuit arrangements, which in their quiescent state have a low level of amplification, but which in response to voice-frequency signals being applied increase the gain of the amplifier to a suitable high level. There are several methods for effectuating this result, the most widely used one of which is to rectify some of the amplified voice signals and feed back the resultant direct current to the amplifier to increase the gain of one or more of its stages. Such an arrangement is exemplified by the diode 44, which receives some of the amplifier signal through a condenser 46, rectifies it, and applies it to a filter network 48, and the output of the filter network is fed back to increase the gain of the amplifier.

In the present embodiment of the invention, it is desired to determine the attack time, or response of the input amplifier 42 to voice signals, and also to establish the recovery time, or time taken to return to the quiescent state after the termination of voice signals. There are many ways of accomplishing this. However, for the purpose of this explanation, a variable filter resistor 50 is provided which is connected in series with the cathode of the diode 44. Also, a variable bleeder resistor 52 is provided, which is connected in parallel with a filter condenser 54, which is connected to maintain the rectified D.C. voltage level. By varying the value of the resistance 50, the time for charging the condenser 54 may be controlled, and thereby the time required for applying a voltage to the input amplifier to increase its gain is controlled, in turn. The variable resistance 52 is used to drain or bleed any voltage from condenser 54, should signals being applied thereto terminate. The time required for this is a function of the value of the resistor 52. Thus, the recovery time of the input amplifier may be suitably controlled.

In the voice-signal-receiving-circuit path, which is terminated by a loudspeaker 56, there is included an output amplifier 58, which feeds the loudspeaker 56. The output amplifier and its circuitry exemplifies a well-known article of commerce, which, in its quiescent state, provides a high-gain value. Small signals applied to its input, therefore, are amplified with high gain. As the level of these signals begins to increase, however, the gain of the amplifier decreases. This type of operation is achieved by the use of a network similar to that shown for the expander amplifier 42, which, however, applies the direct-current voltage derived by rectifying the output signal to a point in the amplifier to decrease the gain provided by the amplifier to the input signals.

Thus, by way of exemplification, the output of the output amplifier 58 is connected to a condenser 60, which in turn is connected to a rectifier 62. The rectifier feeds a filter network 64, which includes a series-variable resistor 66, and a shunt condenser 68. The output from the shunt condenser is applied back into the amplifier 58 in a manner to provide the compressor amplifier characteristics. Since, for the purposes of this invention, it is desirable to control the attack time, or decrease in gain in response to input signals, as well as to control the recovery time, or return to initial gain conditions upon termination of input signals, the resistor 66 is made variable to enable setting the time required for the condenser 68 to be charged up, and a variable resistor 70 is connected across the condenser 68 to enable establishment of the proper recovery time.

The output of the input amplifier 42 is connected to the secondary coil 34 through a resistor 72. It is also connected to one end of a condenser 74 and a potentiometer 76, which have their other ends connected to the junction between the coils 32 and 34. The input to the output amplifier 58 is connected to one end of the secondary winding 32 and to one end of the potentiometer 76 and condenser 74. The purpose of the potentiometer 76 and condenser 74 is to serve as a shunt resistance and compensating capacity to balance the repeater coil 24 and to provide a gain reduction on the order of 25 db between the transmitting circuit and receiving circuit. This allows ample loudspeaker volume in a conference room without feedback.

Figure 2:
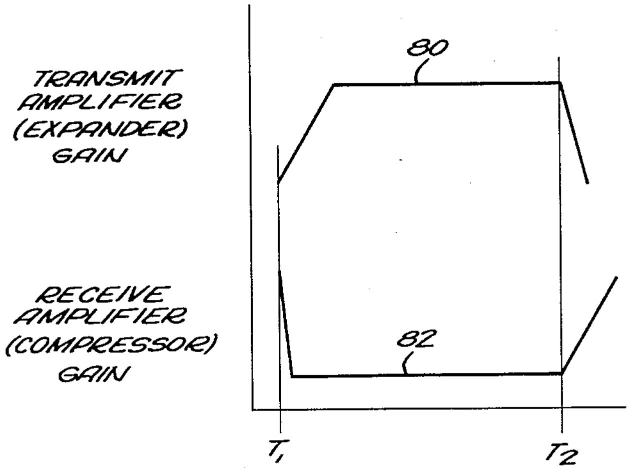
FIGURE 2 illustrates wave shapes representative of the relative attack and recovery time of the input and output amplifiers employed in the embodiment of the invention.

FIGURE 2 is a wave shape diagram of the desired attack and recovery times for the respective input and output amplifiers. The characteristics provided are such that as shown by the wave shape 80, representing the gain characteristic of the input amplifier, and the wave shape 82, representing the gain characteristic of the output amplifier, the attack time of the input amplifier is slower than that of the output amplifier, and the recovery time of the input amplifier is faster than that of the output amplifier. By having the input amplifier operate with a slower attack time than the output amplifier, the receiving channel gain is reduced before the transmitting channel gain is increased. Therefore, the total loop gain never exceeds the amount necessary to "sing." In reverse, when talking ceases, the input amplifier decreases its gain faster than the output amplifier increases its gain. The combination of these actions allows the system to function at higher gains than heretofore, and thus permits a greater volume to be obtained from the loudspeaker than heretofore possible without singing.

The arrangement shown for coupling the receiving and transmitting circuits to the line allows transmission of a strong signal to the line while passing to the receiving circuit a local signal of strength comparable to that of a weak distant signal received from the line. The balance potentiometer 76 permits balance against line which may depart appreciably in impedance from the standard 600-ohm line, for which this arrangement was initially designed. The use of the repeater coil 12 permits connection to either a single two-wire line or to separate transmit-and-receive lines, usually referred to as a four-wire circuit. The adjustment of the potentiometer 76 is a simple one. When energy from the signal-transmission circuit is being transmitted, this potentiometer is adjusted so that minimum energy appears across the receiving input terminals. In an embodiment of the invention which was built, the attenuation of the signal from the output of the input amplifier to the input to the output amplifier exceeded 50 db. With the arrangement shown, the incoming energy from the line is at a maximum across the receiving amplifier input, and, as described, when the transmitting circuit is employed, the output signal is at a maximum across the secondary coils 34 and there is sufficient attenuation of the signal thereafter as far as the input to the output amplifier is concerned to prevent singing. It is preferable to employ a microphone of the cardioid type, which is mounted so that its back is toward the loudspeaker. This affords a considerable further reduction in feedback by virtue of the fact that there is usually at least a 20 db difference in sensitivity between the back and front of the better-type microphones having a cardioid pattern.

There has accordingly been described and shown herein a novel, useful, and simple arrangement for a telephone conference system which provides continuous transmission in both directions on a two-wire telephone circuit. The volume expansion and compression in the transmit-and-receive circuits function independently of one another and only in response to the voice signals in these circuits. The connection to the transmission line is a simple one and has a sufficient attenuation therein to prevent singing as a result of the passage of signals between these two circuits.

We claim:

1. A telephone conference set comprising a voice-signal transmitting circuit including an input amplifier having means for increasing its gain upon the application of voice signals thereto from a minimal level to a relatively high level at one rate and for decreasing its gain back to said minimal level at a second rate faster than said one rate upon termination of said voice signals, a voice-signal receiving circuit including an output amplifier having means for decreasing its gain upon the application of voice signals thereto from a maximum level to a lower level at a rate faster than said one rate, and for increasing its gain upon termination of said voice signals to said maximum level at a rate slower than said second rate, line terminals, and means coupling said voice-signal receiving and transmitting circuits to said line terminals including means for attenuating voice signals passing from one to the other of said circuits.

2. A telephone conference system comprising a voice-signal transmitting circuit including an input amplifier characterized by having its gain increase upon the application of voice signals thereto at one rate and decrease at a second rate faster than said one rate upon the termination of said voice signals, a voice-signal receiving circuit including an output amplifier characterized by having its gain decrease upon the application of voice signals thereto at a rate faster than said one rate and increase at a rate slower than said second rate, line terminals, and means coupling said voice-signal receiving and transmitting circuits to said line terminals.

3. A telephone conference set as recited in claim 2 wherein said means coupling said voice-signal receiving and transmitting circuits to said line terminals includes a repeater transformer havng a primary winding and a pair of secondary windings, means coupling said primary winding to said line terminals, a potentiometer, means connecting one end of each of said secondary windings to one end of said potentiometer, means connecting the output of said input amplifier to the other ends of one of said secondary windings and said potentiometer, and means connecting the input of said output amplifier to the other ends of the other of said secondary windings and said potentiometer.

4. A telephone conference set comprising a voice-signal transmitting circuit including an input amplifier having means for increasing its gain upon the application of voice signals thereto from a minimal level to a relatively high level at one rate and for decreasing its gain back to said minimal level at a second rate faster than said one rate upon termination of said voice signals, a voice-signal receiving circuit including an output amplifier having means for decreasing its gain upon the application of voice signals thereto from a maximum level to a lower level at a rate faster than said one rate, and for increasing its gain upon termination of said voice signals to said maximum level at a rate slower than said second rate, a repeater transformer having first and second primary windings and respectively associated third and fourth secondary windings, a potentiometer, a condenser connected across said potentiometer, means coupling said third secondary winding between the output of said input amplifier and one end of said potentiometer, means coupling said fourth secondary winding between said potentiometer one end and the input of said output amplifier, line terminals, and means for coupling said first and second primary windings to said line terminals.

5. A telephone conference set as recited in claim 4 wherein said means for coupling said first and second primary winding to said line terminals includes an attenuator pad and a second repeater coil.

References Cited in the file of this patent

UNITED STATES PATENTS

| | | |
|---|---|---|
| 2,164,344 | Norwine | July 4, 1939 |
| 2,468,205 | Kellogg | Apr. 26, 1949 |

FOREIGN PATENTS

| | | |
|---|---|---|
| 509,613 | Great Britain | July 19, 1939 |

OTHER REFERENCES

Olson, "Elements of Acoustical Engineering," 2nd Ed., pgs. 446–447.

Van Nostrand, "The International Dictionary of Physics and Electronics."